United States Patent [19]

Reule

[11] Patent Number: 4,634,215
[45] Date of Patent: Jan. 6, 1987

[54] WAVELENGTH MULTI/DEMULTIPLEXER

[75] Inventor: Alfred Reule, Aalen, Fed. Rep. of Germany

[73] Assignee: Carl-Zeiss-Stiftung, Heidenheim, Fed. Rep. of Germany

[21] Appl. No.: 588,683

[22] Filed: Mar. 12, 1984

[30] Foreign Application Priority Data

Mar. 16, 1983 [DE] Fed. Rep. of Germany ....... 3309349

[51] Int. Cl.$^4$ ............................................. G02B 6/36
[52] U.S. Cl. ............................. 350/96.16; 350/96.15; 350/96.18
[58] Field of Search ............. 370/1; 350/96.13, 96.15, 350/96.16, 96.17, 96.18, 96.19, 96.20

[56] References Cited

U.S. PATENT DOCUMENTS 4,274,706 6/1981 Tangonan .................... 350/96.16 X
4,279,464 7/1981 Colombini ................... 350/96.18 X

FOREIGN PATENT DOCUMENTS 0107927 8/1980 Japan ............................... 350/96.16

OTHER PUBLICATIONS

"Spectral demultiplexer with a Plate Waveguide" by Belovolov et al. Sov.J.Quantum Electron. 12(2) Feb. 1982.
"Slab Waveguide Demultiplexer for Multimode Optical Transmission" by Watanabe et al., Applied Optics/vol. 19, No. 21/1 Nov. 1980.

Primary Examiner—William L. Sikes
Assistant Examiner—Akm E. Ullah
Attorney, Agent, or Firm—Walter Ottesen

[57] ABSTRACT

Channel separation of wavelength multi/demultiplexers using a grating structure in a planar multimode slab waveguide is improved by choosing the thickness of the slab waveguide to be greater than the input diameter at least in the area of the grating structure. The aperture of the radiation incident upon the grating structure is chosen to be correspondingly smaller than the input aperture.

15 Claims, 14 Drawing Figures

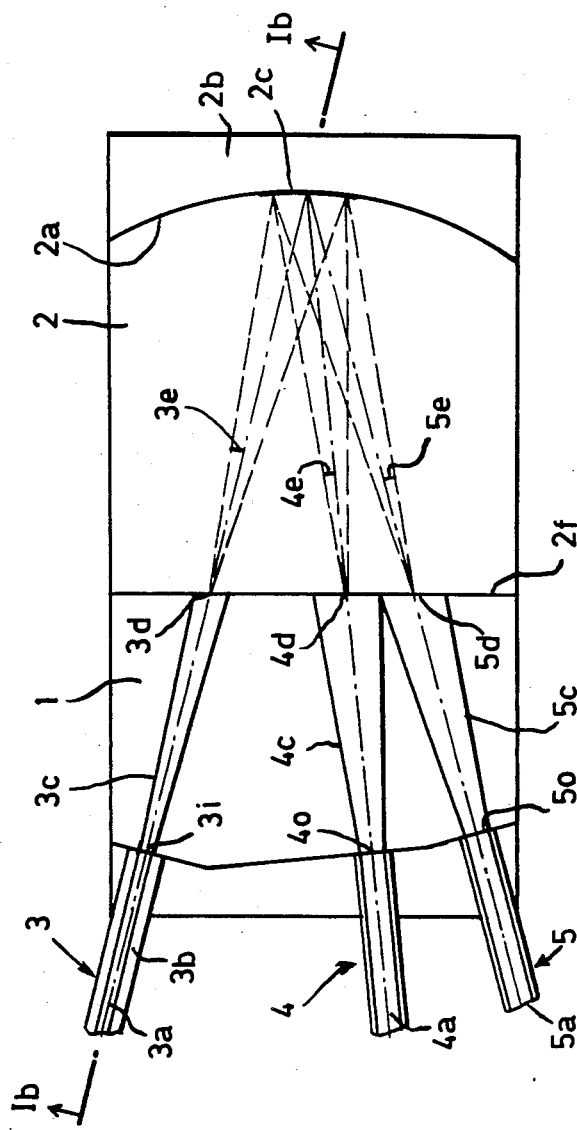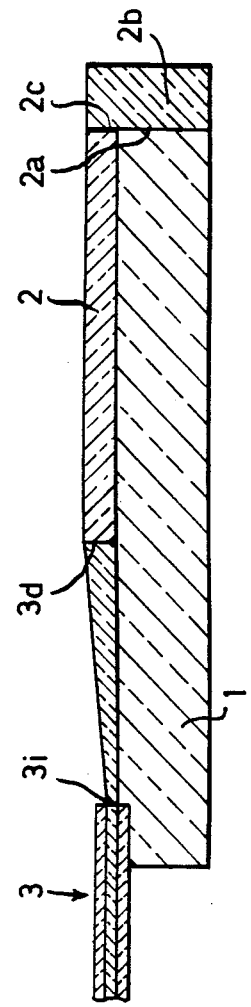
Fig.1a
Fig.1b

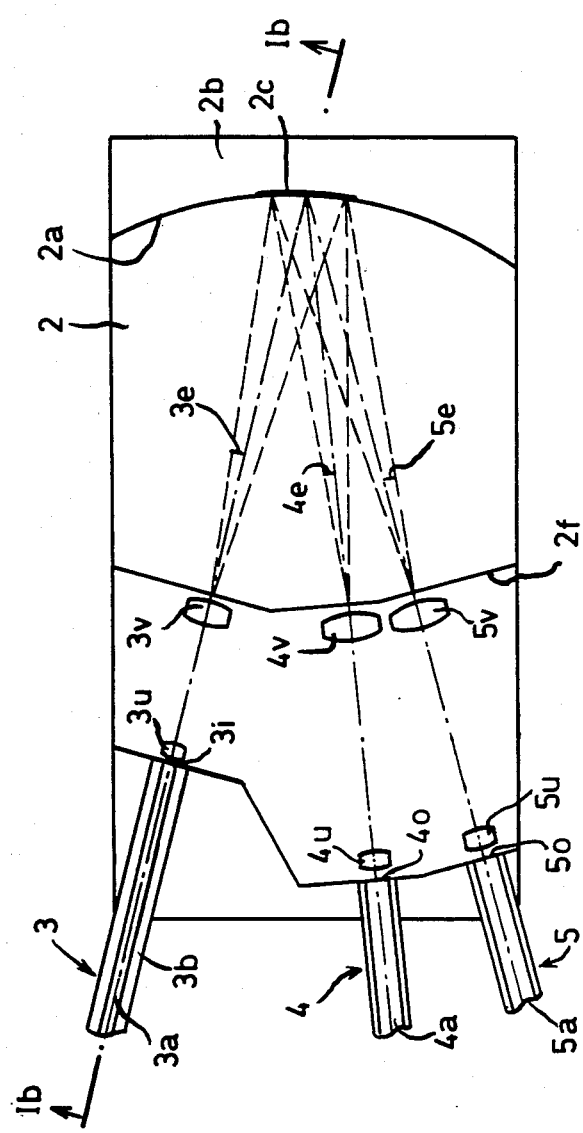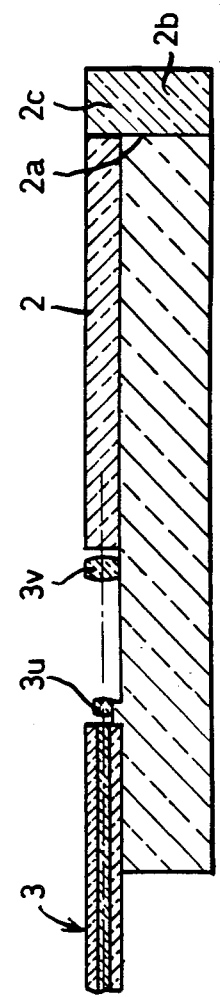

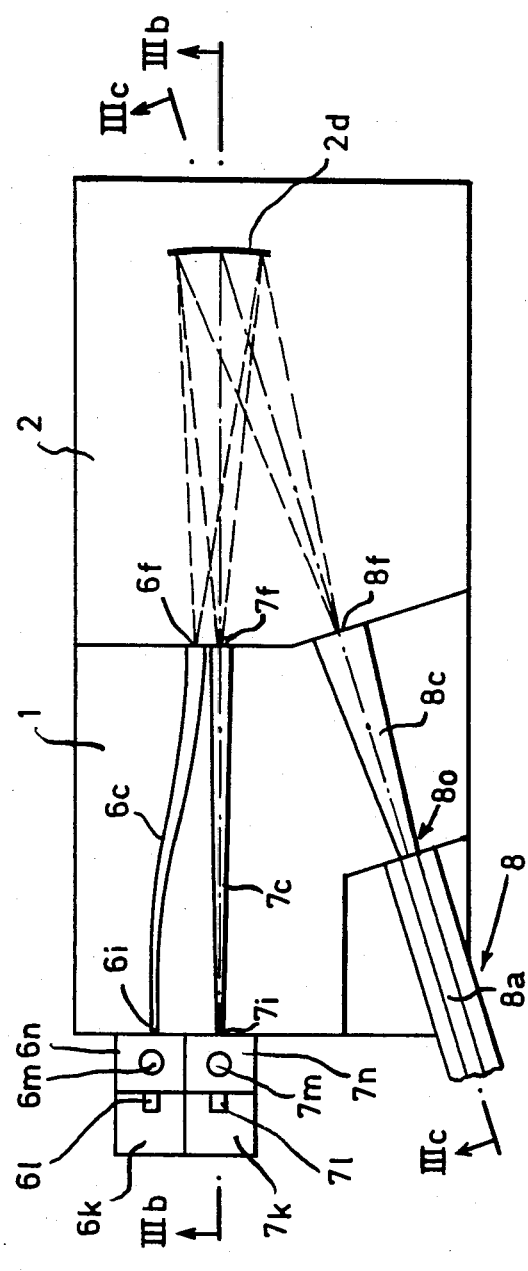
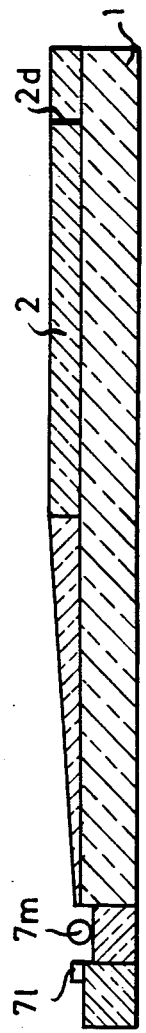
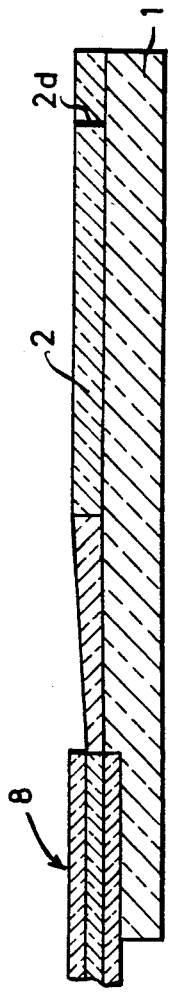
Fig. 3a
Fig. 3b
Fig. 3c

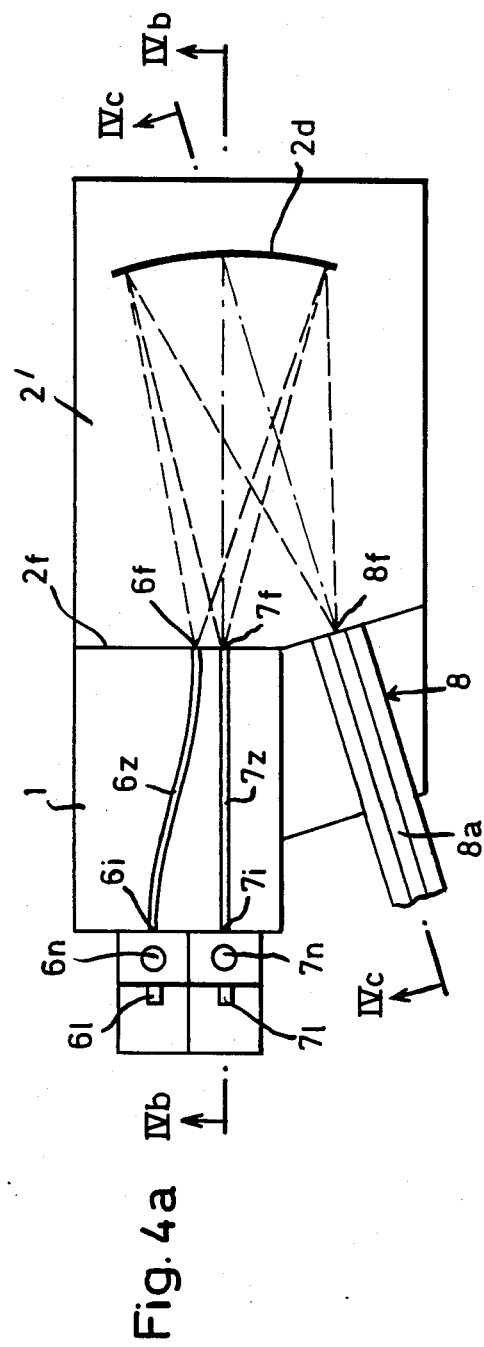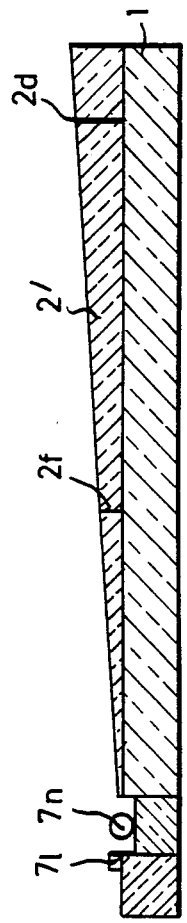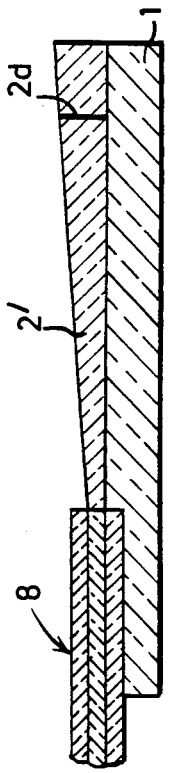
Fig. 4a
Fig. 4b
Fig. 4c

WAVELENGTH MULTI/DEMULTIPLEXER

FIELD OF THE INVENTION

The invention relates to a wavelength multi/demultiplexer having a grating structure in a planar multimode slab waveguide.

BACKGROUND OF THE INVENTION

Wavelength multiplexers and demultiplexers are used in optical-fiber transmission technology to increase the transmission capacity. For this purpose, the modulated radiation from a plurality of light sources of different wavelengths are transmitted through an optic fiber concurrently. To minimize losses when combining and separating the various wavelength channels at the beginning and end of the transmission path, multiplexers and demultiplexers are known that utilize either interference filters or diffraction gratings. A particularly compact and small configuration is achievable through the use of slab waveguides.

From the journal "Applied Optics", Volume 19, Number 21, (1980), pages 3588 to 3590, a multimode slab waveguide demultiplexer is known using a concave grating. The input fiber has a core diameter of 60 μm, and the output fibers have a core diameter of 250 μm. To avoid coupling losses, the guide layer of the slab waveguide is chosen to be 80 μm thick, thus being greater than the core diameter of the input fiber and smaller than the core diameter of the output fibers.

In a later edition of "Applied Optics", Volume 21, Number 12, (1982), pages 2195 to 2198, a multimode slab waveguide demultiplexer is described which uses a chirped grating. The core diameter and numerical aperture of the optic fibers approximately coincide with those of the slab waveguide.

With these known multimode slab waveguide demultiplexers, sufficient channel separation is only achievable at a channel spacing from 30 nm to 50 nm which corresponds to a wavelength range from 0.8 μm to 1.3 μm, approximately. With a decrease in the channel spacing, a channel overlap occurs because of the propagation of the light in the multimode slab waveguide; however, this channel overlap reaches such a magnitude that the channel separation is no longer sufficient for applications in communications technology.

SUMMARY OF THE INVENTION

It is an object of the invention to provide a multimode slab waveguide multi/demultiplexer which ensures sufficient channel separation with a lower channel spacing. It is a further object of the invention to provide a multimode slab waveguide multi/demultiplexer which ensures sufficient channel separation when the channel spacing is approximately 10 nm.

The wavelength multi/demultiplexer is optically connectable to a radiation conductor and includes a planar multimode slab waveguide having a grating formed therein. Transition means are provided for conducting radiation from the radiation conductor in the direction toward the grating. The transition means has an input cross-section through which the radiation from the radiation conductor passes when entering the same, the entering radiation having a first aperture. The transition means is configured to alter the aperture of the radiation conducted therein so as to cause the radiation to impinge upon said grating at a second aperture in a plane perpendicular to the plane of said slab waveguide and the second aperture is less than the first aperture. Also, the slab waveguide has a thickness in the region of the grating that is greater than the thickness of the input cross-section of the transition means.

Thus, the object is achieved by the wavelength multi/demultiplexer of the invention in that the thickness of the slab waveguide in the region of the grating structure is greater than the thickness or the diameter of the input cross-section, and in that the aperture of the radiation incident on the grating structure in the plane perpendicular to the slab plane is smaller than the aperture in the input cross-section.

In an advantageous embodiment, the aperture of the radiation incident on the grating structure in the plane perpendicular to the slab is 0.1 or less. By increasing the thickness, that is, the cross-section, while at the same time reducing the aperture, the total luminous flux is maintained so that practically no losses occur. Reducing the aperture to considerably less than 0.05 results in no appreciable further improvement because then, for example, the imaging defects of the concave grating would become too noticeable.

In another advantageous embodiment, light-conducting wedge-shaped interface members are provided to couple the optic fibers to the slab waveguide. The thickness of the interface members increases gradually from the thickness or diameter of the input cross-section to the thickness of the slab waveguide. In this embodiment, the width of the interface members may also increase. It is appropriate to provide light-conducting interface members also on the output side of the slab waveguide.

In a particularly advantageous embodiment, the slab waveguide is wedge-shaped at least in one region between the grating structure and the boundary surface adjacent thereto through which the radiation enters and exits.

BRIEF DESCRIPTION OF THE DRAWING

The invention will now be described with reference to the drawing wherein:

FIG. 1a is a plan view of a demultiplexer according to the invention including light-conducting interface members disposed between the optic fibers and the slab waveguide;

FIG. 1b is an elevation view, in section, of the demultiplexer of FIG. 1a taken along line Ib—Ib thereof;

FIG. 1c is a plan view of a demultiplexer including lenses between the optic fibers and the slab waveguide;

FIG. 1d is an elevation view, in section, of the demultiplexer of FIG. 1c taken along line Id—Id thereof;

FIG. 3a is a plan view of a multiplexer with a slab waveguide of constant thickness;

FIG. 3b is an elevation view, in section, of the multiplexer of FIG. 3a taken along line IIIb—IIIb thereof;

FIG. 3c is an elevation view, in section, of the multiplexer of FIG. 3a taken along line IIIc—IIIc thereof;

FIG. 4a is a plan view of a multiplexer with a tapered slab waveguide;

FIG. 4b is an elevation view, in section, of the multiplexer of FIG. 4a taken along line IVb—IVb thereof; and, FIG. 4c is an elevation view, in section, of the multiplexer of FIG. 4a taken along line IVc—IVc thereof.

DESCRIPTION OF THE PREFERRED EMBODIMENTS OF THE INVENTION

Figure 1E:
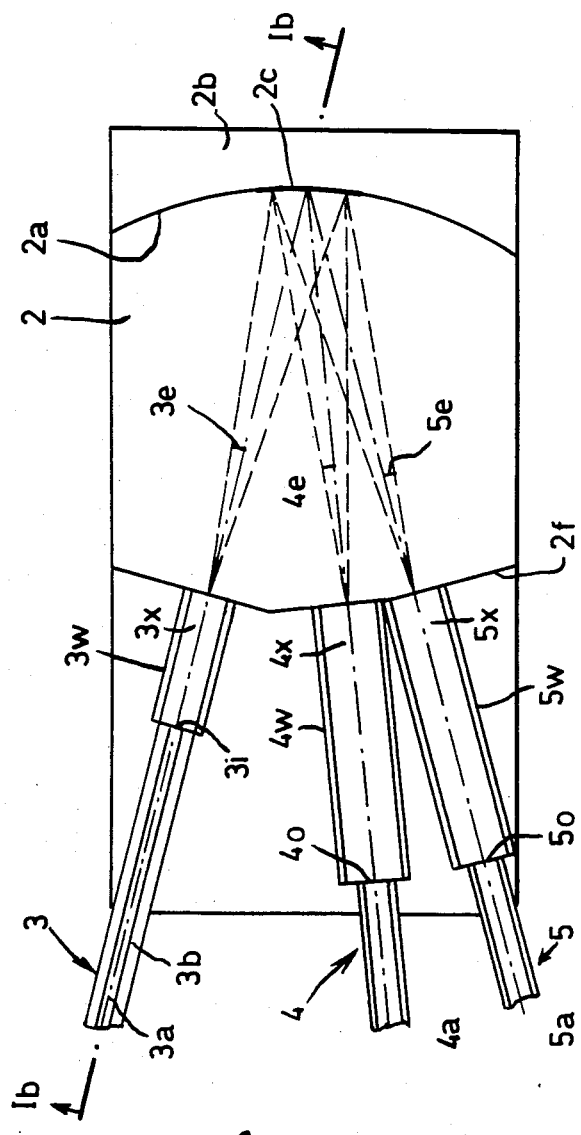
FIG. 1e is a plan view of a demultiplexer including gradient rod lenses between the optic fibers and the slab waveguide.

Referring now to FIGS. 1a and 1b, reference numeral 1 identifies a substrate carrying the slab waveguide 2. One end of the substrate 1 and slab waveguide 2 is bounded by a concave surface 2a to which part 2b with the grating structure 2c is attached. The input fiber 3 made up of core 3a and cladding 3b is coupled to the other end of the slab waveguide 2. For the sake of clarity, only two of the output fibers are shown and are identified by reference numerals 4 and 5. The cores 4a and 5a of fibers 4 and 5, respectively, are coupled to the slab waveguide 2 via corresponding interface members 4c and 5c. Interface members 3c, 4c and 5c are applied to the substrate 1 utilizing a technique known, for example, from German published patent application DE-OS No. 3,024,104. Likewise, the coupling of the optic fibers 3, 4 and 5 to their corresponding light-conducting interface members 3c, 4c and 5c is accomplished using known techniques.

The light-conducting interface members 3c, 4c and 5c provide for the transition of the core diameters 3a, 4a and 5a of the optic fibers 3, 4 and 5 to the thickness of the slab waveguide 2.

Because of this change in tapered thickness as shown in FIG. 1b and of the gradual widening of the interface members as shown in FIG. 1a, the aperture of the radiation conducted in the interface members is changed. For purposes of clarification, the dimensions of the optic fibers 3, 4 and 5, of their associated interface members 3c, 4c and 5c, and the thickness of the slab waveguide 2 are all exaggerated compared with the other dimensions. In a practical embodiment of the invention, the input fibers have a core diameter 3a of 50 $\mu$m, while the output fibers have core diameters 4a and 5a of 100 $\mu$m. For manufacturing reasons, the interface members are of square or rectangular cross-section, with the interface member 3c having an input cross-section 3i of 50 $\mu$m $\times$ 50 $\mu$m and an output cross-section 3d of 200 $\mu$m $\times$ 200 $\mu$m; interface members 4c and 5c have cross-sections 4o and 5o of 100 $\mu$m $\times$ 100 $\mu$m and cross-sections 4d and 5d of 400 $\mu$m $\times$ 200 $\mu$m. The slab waveguide 2 is 200 $\mu$m thick; its other dimensions are approximately 20 mm $\times$ 15 mm.

The concave grating structure 2c is arranged in the slab waveguide 2 in a known manner such that the spectrum of the input cross-section 3d is imaged on the boundary surface 2f. Since the interface members 4c and 5c coupled at surface 2f are of greater width in their cross-sections 4d and 5d than interface member 3c in its cross-section 3d, tolerances in the wavelengths of the individual channels are compensated for.

In FIG. 1a, the numerical aperture (NA) of the input radiation in the slab waveguide 2 is identified by reference numeral 3e, and the numerical aperture for the two wavelength channels of the output radiation by 4e and 5e, respectively. It is in accordance with this numerical aperture that the difference in the refractive index between substrate 1 and slab waveguide 2 is chosen. If, for example, the aperture of the optic fiber is 0.24 and if this aperture is to be reduced by factor of 4 to 0.06, the difference in the refractive index $\Delta n$ between substrate 1 and slab waveguide 2 has to be equal to 0.0012, if the refractive index n for the substrate is 1.5, this being in accordance with the approximation equation $\Delta n = (NA)^2/2n = (0.06)^2/2(1.5)$.

The difference in the refractive index of the interface members 3c, 4c and 5c relative to the substrate 1 is practically of the same magnitude as the difference between fiber core and cladding of the optic fibers so that the refractive index remains unchanged in the transition region between the interface members and the slab waveguide 2. A substrate may be disposed on the slab waveguide 2 and on or adjacent to the interface members 3c, 4c and 5c, or an air closure may be provided.

In FIGS. 1c and 1d, lenses 3u, 3v, 4u, 4v, 5u and 5v are substituted for the interface members of FIGS. 1a and 1b and are placed between the slab waveguide 2 and the optic fibers 3, 4 and 5. The diameter of lens 3v corresponds at least to the thickness of the slab waveguide 2. The diameter of lens 3u corresponds at least to the diameter of the input cross-section 3i. Lenses 3u and 3v have the same focal length and are spaced at a distance from each other corresponding to this focal length. The focal length is chosen so that the radius of the input cross-section 3i appears from lens 3v at an angle whose sine corresponds to the desired numerical aperture 3e in the slab waveguide 2. Diameter and focal length of the output lenses 4u, 4v and 5u, 5v are greater than those of the input lenses 3u and 3v in the same proportion in which the diameter of the output cross-sections 4o and 5o is greater than the diameter of the input cross-section 3i.

Figure 1F:
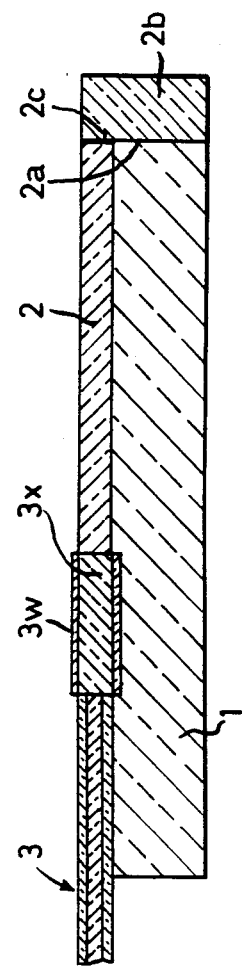
FIG. 1f is an elevation view, in section, of the demultiplexer of FIG. 1e taken along line If—If thereof.

A further advantageous embodiment is shown in FIGS. 1e and 1f wherein the lenses of FIGS. 1c and 1d are substituted with gradient rod lenses 3w, 4w and 5w. These rod lenses have the same numerical aperture as the optic fibers 3, 4 and 5 and provide a direct connection between the latter and the slab waveguide 2. Gradient rod lens 3w has a core diameter designated by 3x which is equal to the thickness of the slab waveguide 2. Its length is one fourth of the period length. The rod lens reduces the numerical aperture of the input rays in the ratio of the input diameter 3i (which is equal to the core diameter 3a of the optic input fiber) to the core diameter 3x. At the output end, the diameters 4x and 5x of the gradient rod lenses 4w and 5w, respectively, are greater than the thickness of the slab waveguide 2 in the ratio of the output diameters 4o and 5o to the input diameter 3i. The length of rod lenses 4w and 5w is likewise one fourth of the period length; because of the greater diameter, the length of rod lenses 4w and 5w exceeds the length of the gradient rod lens 3w.

Figure 2A:
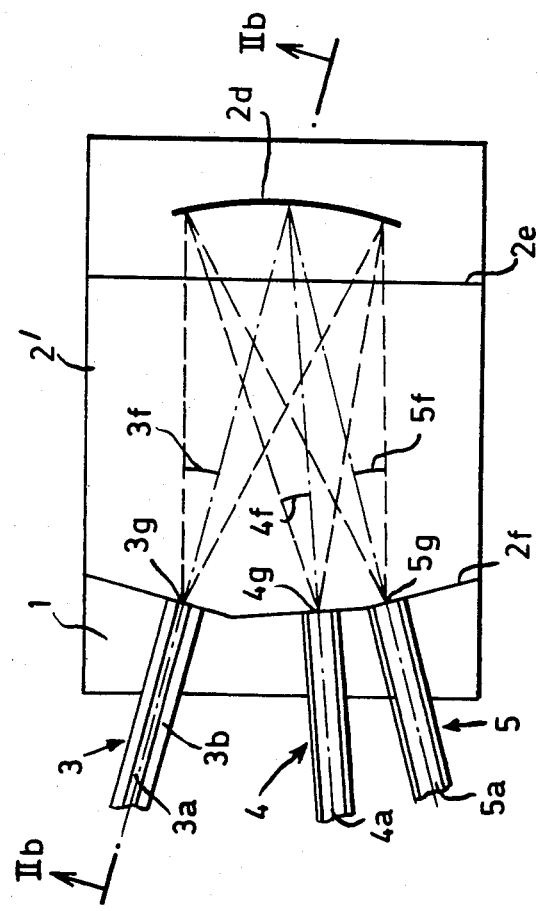
FIG. 2a is a plan view of a demultiplexer in which the optic fibers are directly coupled to a tapered slab waveguide.
Figure 2B:
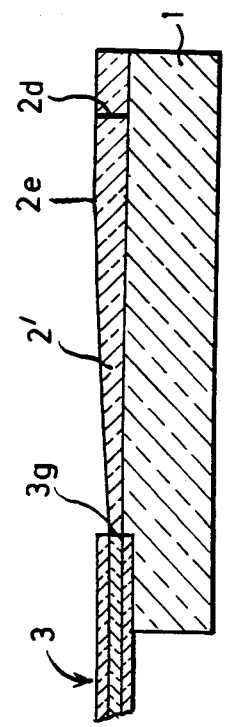
FIG. 2b is an elevation view, in section, of the demultiplexer of FIG. 2a taken along line IIb—IIb thereof.

FIGS. 2a and 2b illustrate a particularly advantageous embodiment of a demultiplexer, in which the optic fibers 3, 4 and 5 are directly coupled to the slab waveguide 2' and the thickness and aperture changes are achieved in the slab waveguide 2' itself. Moreover, in this embodiment the grating structure 2d is directly fabricated in the slab waveguide 2'. This may be achieved, for example, by coating the surface of the slab waveguide 2' with photosensitive resist. The photosensitive resist is exposed with the image of a grating structure and subsequently developed. After the grating structure is etched from the slab waveguide, a metal coating is applied.

In FIGS. 2a and 2b, the input fiber is again assigned reference numeral 3, and the output fibers are assigned reference numerals 4 and 5. On the coupling side of the optic fibers whereat the latter have cross-sections 3g, 4g and 5g, the slab waveguide 2' has a thickness corresponding to the core diameter 3a of the input fiber 3. This thickness increases uniformly up to line 2e, for example, from 50 μm to 200 μm. However, it is also possible to eliminate this discontinuity 2e and let the thickness increase up to a location behind the grating structure 2d.

As a result of the tapered increase in thickness of the slab waveguide 2', the numerical aperture of the radiation in the plane perpendicular to the slab substrate is reduced by a factor of 4. In contrast, the apertures identified by reference numerals 3f, 4f and 5f in FIG. 2a remain unchanged in the plane parallel to the substrate. This is practically of no significance for channel separation since the separation of channels depends only on the aperture of the radiation in the plane perpendicular to the substrate or parallel to the grooves of the grating structure. The larger aperture of the radiation parallel to the substrate merely results in larger imaging distortions of the concave grating structure 2d than is the case in the embodiment of FIG. 1a; with the indicated dimensions, however, these imaging distortions do not play a decisive role yet. A disadvantage of the embodiment of FIG. 2a compared with the one of FIG. 1a is that the extension of the grating structure 2d perpendicular to the grooves has to be greater by a factor of 4; on the other hand, it affords a more straightforward configuration. In the embodiment shown in FIGS. 2a and 2b, the refractive index of the slab waveguide 2' is equal, or practically equal, to the refractive index of the cores 3a, 4a and 5a of the optic fibers.

It is possible to maintain the width of the interface members 3c, 4c and 5c in FIG. 1a unchanged from the input to the output end. In this case, the interface members would only change the aperture of the radiation in the plane perpendicular to the substrate, and the grating 2a would have to be four times as large in the direction perpendicular to the direction of the grooves. This would have no practical effect on channel separation. It is to be understood that the width could also be increased by a factor smaller than 4.

FIGS. 3a to 3c show a first embodiment of a multiplexer. Here again, reference numeral 1 identifies the substrate, reference numeral 2 the slab waveguide, and reference designation 2d identifies the grating structure. As in the above-mentioned embodiments of a demultiplexer, for clarity, only two input channels are shown in this and the next embodiment, the input channels being coupled to the slab waveguide 2 via interface members 6c and 7c. The radiation emerges from the laser diodes 6i and 7i which have a diameter of approximately 15 μm, with a numerical aperture of approximately 0.4 perpendicular to the plane of the drawing, and of approximately 0.15 parallel to the plane of the drawing.

This radiation is imaged through the spherical lenses 6m and 7m on the input cross-sections 6i and 7i of the interface members 6c and 7c on a 1:1 scale. The cross-section of the interface members increases from 15 μm to 120 μm in the direction perpendicular to the substrate; this causes the aperture of radiation to be reduced from 0.4 to 0.05. In the direction parallel to the substrate, the cross-section increases from 15 μm to 45 μm, resulting in a decrease in the aperture of radiation from 0.15 to 0.05 in this plane. On the input side of the slab waveguide 2, the ends of the interface members 6c and 7c lie closely one next to the other; at its other end, their ends are spaced farther apart, caused by the mountings 6k and 7k of the laser diodes 6i and 7i and the mountings 6n and 7n of the spherical lenses 6m and 7m.

The slab waveguide 2 has a constant thickness of 120 μm. The grating structure 2d located in slab waveguide 2 combines the radiations of different wavelengths present at the input cross-sections 6f and 7f in cross-section 8f. In view of unavoidable tolerances, in particular of the laser diodes, and of the effects of temperature, et cetera, interface member 8c has a width of 120 μm in cross-section 8f parallel to the substrate, which width is reduced to 40 μm in cross-section 8o. In the plane normal to the substrate 1, the 120 μm thickness in cross-section 8f, which corresponds to the thickness of the slab waveguide 2, is likewise reduced to 40 μm in cross-section 8o, so that the entire radiation is taken up by the connected optic fiber 8, the core 8a of which has a diameter of 50 μm.

In interface member 8c, the aperture increases from 0.05 to 0.15, that is, to a value fully transmitted by the optic fiber 8. As in the embodiments of FIG. 1, a difference in refractive index occurs in the transition area between the interface members 6c, 7c and 8c and the slab waveguide 2.

FIGS. 4a to 4c show still another embodiment of a multiplexer. Here again, an aperture change occurs in the slab waveguide 2'. Because of the very large aperture of the laser diodes in the plane perpendicular to the plane of the drawing, interface members 6z and 7z are nevertheless provided on the input side, which reduce the aperture from 0.4 to 0.15 by increasing in thickness from 15 μm in the input cross-sections 6i and 7i to 40 μm in the cross-sections 6f and 7f. In view of their constant width of 15 μm, the aperture of the radiation in the plane parallel to the substrate is maintained at 0.15.

In the slab waveguide 2', an increase in thickness from 40 μm to 120 μm results in a decrease in the aperture from 0.15 to 0.05, followed by an increase to 0.15 again after reflection on the grating structure. The output fiber 8 whose core 8a has a diameter of 50 μm receives the radiation in cross-section 8f with an aperture of 0.15, utilizing only about one third of the core diameter in the plane parallel to the substrate, which again gives sufficient room for unavoidable tolerances.

It is understood that the foregoing description is that of the preferred embodiments of the invention and that various changes and modifications may be made thereto without departing from the spirit and scope of the invention as defined in the appended claims.

What is claimed is:

1. A wavelength multi/demultiplexer optically connectable to a radiation conductor having a core for conducting radiation of a predetermined first aperture, the wavelength multi/demultiplexer comprising:

a planar multimode slab waveguide having a grating formed therein; and, transition means disposed between said radiation conductor and said grating for conducting radiation from the radiation conductor in a direction toward said grating, said transition means having an input cross-section through which the radiation from the radiation conductor passes when entering the same;

said transition means being configured to alter the aperture of the radiation conducted therein so as to cause said radiation to impinge upon said grating at a second aperture in a plane perpendicular to the plane of said slab waveguide, said second aperture being less than said first aperture; and, said slab waveguide having a thickness in the vicinity of said grating that is greater than the thickness of said input cross-section.

2. The waveguide multi/demultiplexer of claim 1, said second aperture being equal to or less than 0.1.

3. The wavelength multi/demultiplexer of claim 2, said transition means including a wedge-shaped interface member disposed between said input corss-section and said slab waveguide, said interface member having a thickness increasing from the thickness of said input cross-section to the thickness of said slab waveguide.

4. The wavelength multi/demultiplexer of claim 3, said interface member having a width increasing from the width of said input cross-section to a width at said slab waveguide that is greater than said first-mentioned width.

5. The wavelength multi/demultiplexer of claim 4, wherein the multi/demultiplexer is optically connectable to a plurality of additional radiation conductors, said transition means including a plurality of additional wedge-shaped interface members for receiving the radiation from said slab waveguide reflected by said grating and conducting the same to respective ones of the plurality of additional radiation conductors, said plurality of wedge-shaped interface members having respective output cross-sections through which the radiation passes to said plurality of radiation conductors, each of said plurality of wedge-shaped interface members having a thickness decreasing from thickness of said slab waveguide to the thickness of said output cross-section and further having a width at said slab waveguide that decreases to the width at said output cross-section.

6. The wavelength multi/demultiplexer of claim 1, wherein the multi/demultiplexer is optically connectable to a plurality of additional radiation conductors, said transition means including a set of lenses disposed between said input cross-section and said slab waveguide, said transition means further including a plurality of additional sets of lenses for receiving the radiation from said slab waveguide reflected by said grating and conducting the same to respective ones of the plurality of additional radiation conductors.

7. The wavelength multi/demultiplexer of claim 1, wherein the multi/demultiplexer is optically connectable to a plurality of additional radiation conductors, said transition means including a gradient rod lens disposed between said input cross-section and said slab waveguide, said transition means further including a plurality of gradient rod lenses for receiving the radiation from said slab waveguide reflected by said grating and conducting the same to respective ones of the plurality of additional radiation conductors.

8. The wavelength multi/demultiplexer of claim 1, wherein the wavelength multi/demultiplexer is optically connectable to a plurality of additional radiation conductors, said slab waveguide having a boundary surface whereat radiation is coupled into the same from said first-mentioned radiation conductor and whereat radiation is coupled into said plurality of additional radiation conductors from said slab waveguide, said transition means being a portion of said slab waveguide disposed between said boundary surface and said grating, said portion having a wedge-shaped configuration when viewed in elevation.

9. The wavelength multi/demultiplexer of claim 5, said interface members having a quadrilaterally-shaped cross-section.

10. The wavelength multi/demultiplexer of claim 5, said first-mentioned wedge-shaped interface member having an input cross-section of approximately 50 $\mu m \times 50$ $\mu m$ and an output cross-section of approximately 200 $\mu m \times 200$ $\mu m$; and, said additional wedge-shaped interface members each having an input cross-section of approximately 400 $\mu m \times 200$ $\mu m$ and an output cross-section of approximately 100 $\mu m \times 100$ $\mu m$.

11. The wavelength multi/demultiplexer of claim 4, said width increasing from approximately 50 $\mu m$ to approximately 200 $\mu m$.

12. The wavelength multi/demultiplexer of claim 1, said transition means including a plurality of interface members each having a cross-section that increases from approximately 15 $\mu m$ to 120 $\mu m$ measured in a direction perpendicular to the plane defined by said slab waveguide.

13. The wavelength multi/demultiplexer of claim 1, said transition means including a plurality of interface members each increasing in thickness from approximately 15 $\mu m$ to 40 $\mu m$ measured in a direction perpendicular to the plane defined by said slab waveguide.

14. A wavelength multi/demultiplexer unit optically connectable to first radiation conductor means for transmitting radiation to the unit and optically connectable to second radiation conductor means for receiving the radiation from the unit, the wavelength multi/demultiplexer unit comprising:

a planar multimode slab waveguide having a grating formed therein; and, first transition means for conducting radiation from said first radiation conductor means in a direction toward said grating, said transition means having an input cross-section through which the radiation from said first radiation conductor means passes when entering the same, the entering radiation having a first aperture;

said transition means being configured to alter the aperture of the radiation conducted therein so as to cause said radiation to impinge upon said grating at a second aperture in a plane perpendicular to the plane of said slab waveguide, said second aperture being less than said first aperture; said first transition means having an output cross-section through which the radiation conducted therein passes therefrom toward said grating; and, second transition means for conducting radiation reflected from said grating in a direction away from said grating, said second transition means having an input cross-section through which the radiation reflected from said grating enters the same, said input cross-section being greater than said output cross-section of said first transition means whereby tolerances in the wavelengths of said radiation are compensated for;

said second transition means further having an output cross-section through which the radiation reflected from said grating passes to enter said second radiation conductor means;

said second transition means being configured to alter the aperture of the radiation conducted therein so as to cause said radiation to enter said second radiation conductor means at a third aperture greater than said second aperture.

15. The wavelength multi/demultiplexer of claim 14, said slab waveguide having a thickness in the region of said grating that is greater than the thickness of both said input cross-section and said output cross-section.

* * * * *